United States Patent

[11] 3,540,510

| [72] | Inventor | John C. Smithkey, Jr.<br>Akron, Ohio |
|---|---|---|
| [21] | Appl. No. | 675,489 |
| [22] | Filed | Oct. 16, 1967 |
| [45] | Patented | Nov. 17, 1970 |
| [73] | Assignee | The Goodyear Tire & Rubber Company<br>Akron, Ohio<br>a corporation of Ohio |

[54] FLEXIBLE CASING PNEUMATIC TIRE
12 Claims, 6 Drawing Figs.

[52] U.S. Cl. .................................................. 152/352,
152/330, 152/353
[51] Int. Cl. ...................................................... B60c 5/00,
B60c 5/12, B60c 13/00
[50] Field of Search .......................................... 152/330,
352, 353, 354; 264/94, 335; 18/2, 42

[56] References Cited
UNITED STATES PATENTS

| 3,237,672 | 3/1966 | McMannis.................... | 152/352 |
| 3,245,454 | 4/1966 | Lewis............................ | 152/354 |
| 3,347,300 | 10/1967 | Sidles........................... | 152/352 |
| 1,354,425 | 9/1920 | Sloper.......................... | 18/42 |
| 1,399,898 | 12/1921 | Sloper.......................... | 264/335 |
| 1,477,391 | 12/1923 | Sloper.......................... | 18/2 |
| 1,487,033 | 3/1924 | Sloper.......................... | 18/2 |
| 1,487,036 | 3/1924 | Sloper.......................... | 18/2 |
| 3,116,778 | 1/1964 | Herzegh et al................ | 152/330 |
| 3,347,300 | 10/1967 | Sidles........................... | 152/353 |
| 3,347,964 | 10/1967 | Sidles........................... | 264/94 |

*Primary Examiner*—Arthur L. La Point
*Assistant Examiner*—Howard Beltran
*Attorneys*—F. W. Brunner and M. W. Goodwin

ABSTRACT: A pneumatic tire which when inflated has dimensions generally associated with a conventional pneumatic tire but when deflated has an outer diameter and a section width substantially the same, and in any event not substantially greater, than the maximum width and diameter of the rim on which the tire is mounted. The tire is built by the flat band method of construction and is molded at least substantially in the cylindrical shape in which it was built. The sidewalls are sufficiently flexible that they may be folded into an S-shape and underneath the tread when the tire is deflated.

INVENTOR.
JOHN C. SMITHKEY, JR.

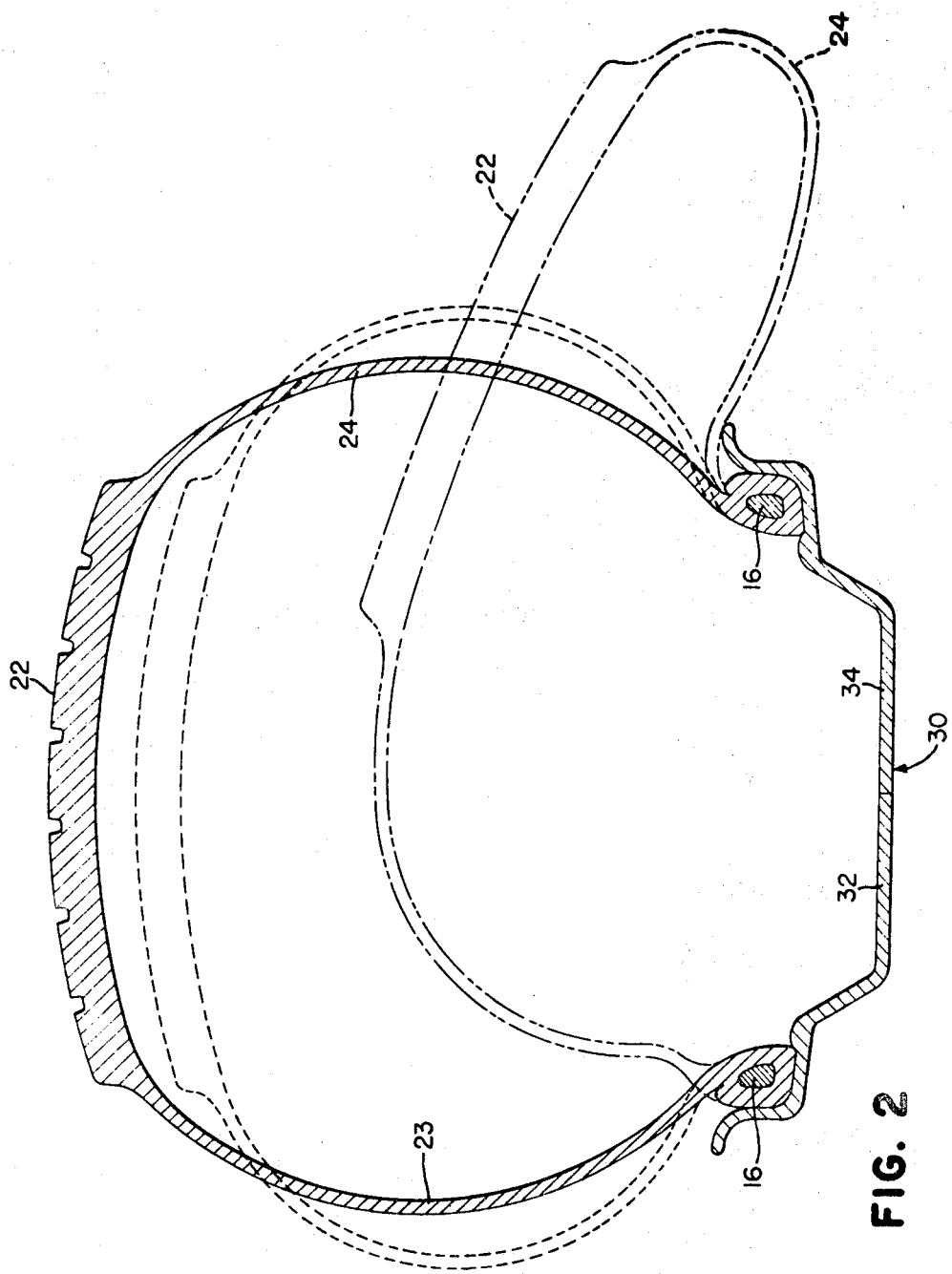

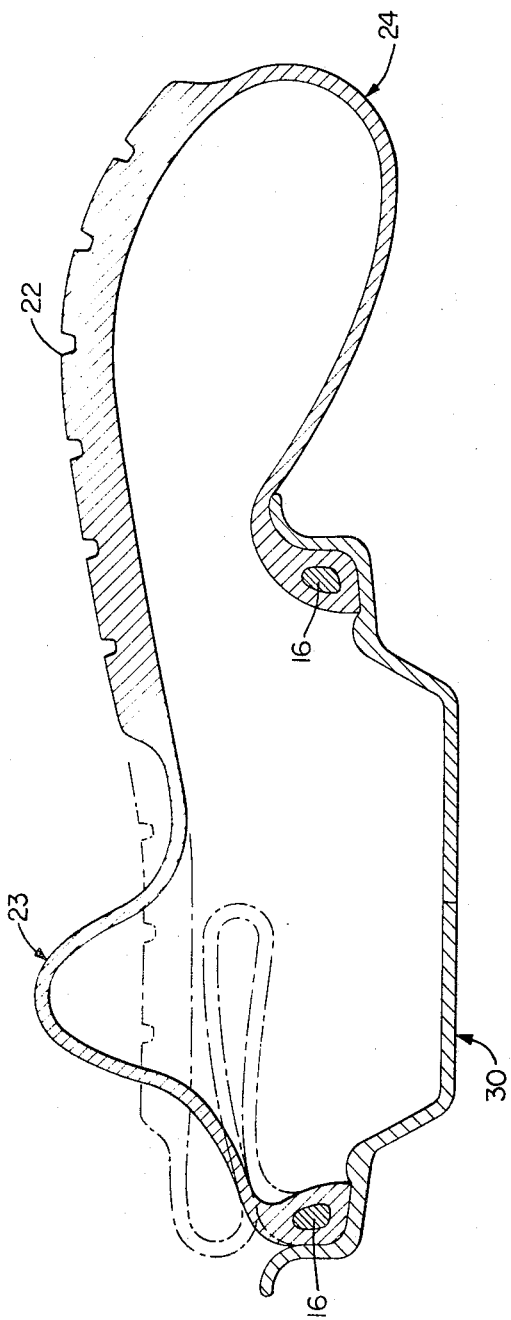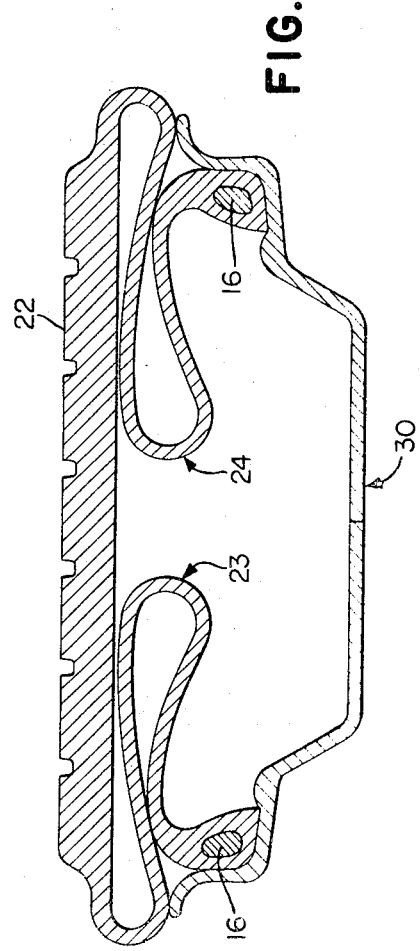

INVENTOR.
JOHN C. SMITHKEY, JR.
BY M. William Goodwin
ATTORNEY

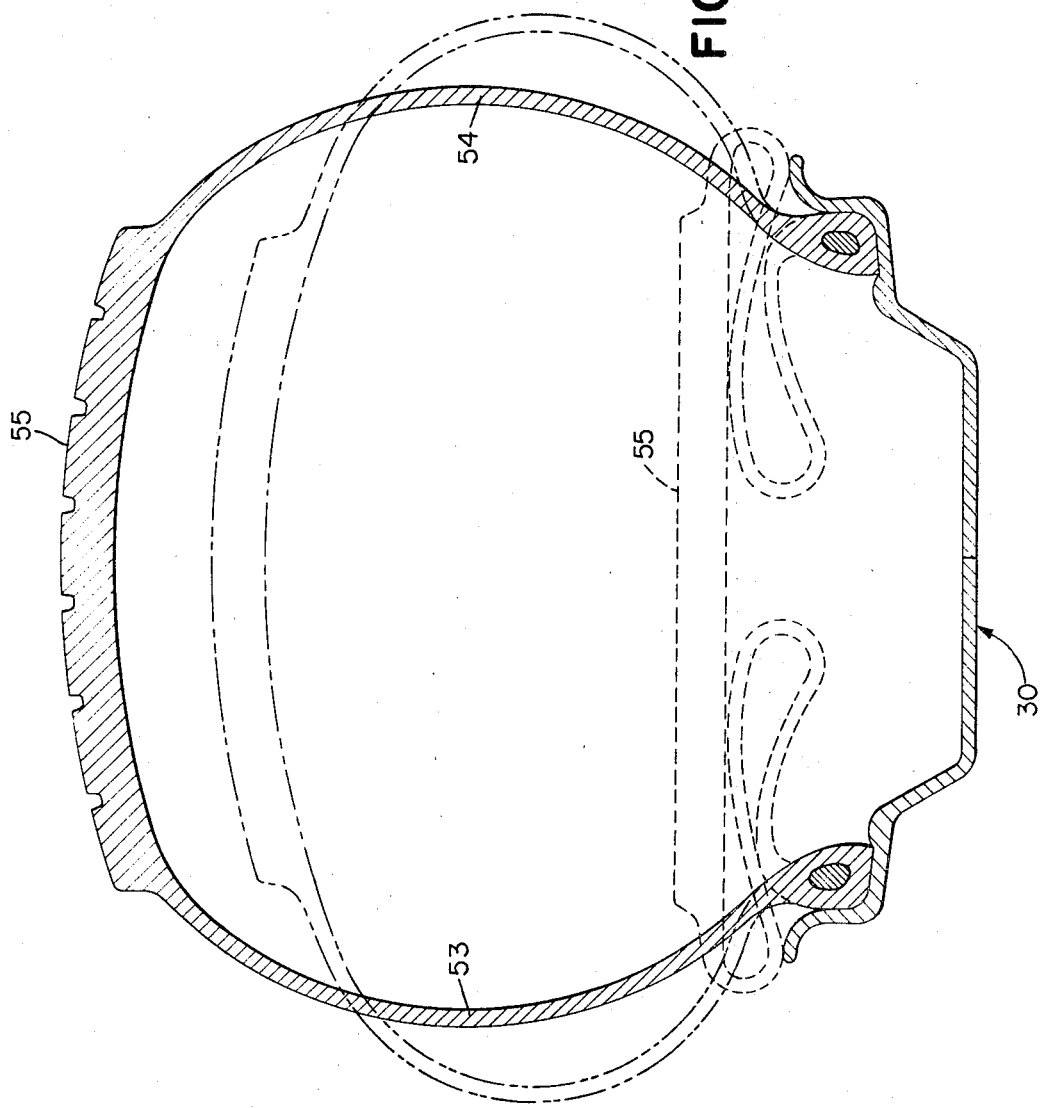

FLEXIBLE CASING PNEUMATIC TIRE

This invention relates generally to pneumatic tires and more particularly to a novel and improved foldable pneumatic tire and a novel and improved method of manufacturing the same.

Due to space limitations in the trunks of certain passenger cars it has become desirable, if not necessary, to devise some means for reducing the space required to store a spare tire in the trunk of the vehicle. Examples of suggested ways of providing a tire having substantially reduced dimensions when deflated are shown in U.S. Pats. No. 3,347,300, No. 3,347,301, No. 3,347,964 and No. 3,116,778.

It is the object of this invention to provide a pneumatic tire which when mounted on a rim and in its deflated condition will have an outer diameter and cross-sectional width which are at most not substantially greater than the maximum diameter and axial dimension of the rim, which can be built by the flat band method of tire building utilizing conventional tire building machinery normally associated with conventional bias ply carcass tires, and particularly which will not require the molding of the tire with its sidewalls folded under the tread yet which can retain the aforementioned reduced dimensions when not mounted on a rim.

The foregoing and other objects, aspects, and features of the invention will be apparent from a consideration of the following description and accompanying drawings, wherein:

FIG. 2 is a cross-sectional view of the tire of FIG. 1 mounted on a rim and shown in solid line in its inflated condition, in broken line in a partially deflated condition, and in chain dotted line in a still further deflated condition;

FIG. 3 is a cross-sectional view of the tire of FIG. 2 shown in solid line in a still further deflated condition, and in chain dotted line showing one sidewall of the tire in substantially folded condition;

FIG. 4 is a cross-sectional view of the tire in the fully deflated and folded condition thereof;

FIG. 6 is a cross-sectional view of the tire of FIG. 5 showing in solid line the tire in its inflated condition, in chain dotted line the tire in a partially deflated condition and in broken line the tire in its folded condition.

Figure 1:
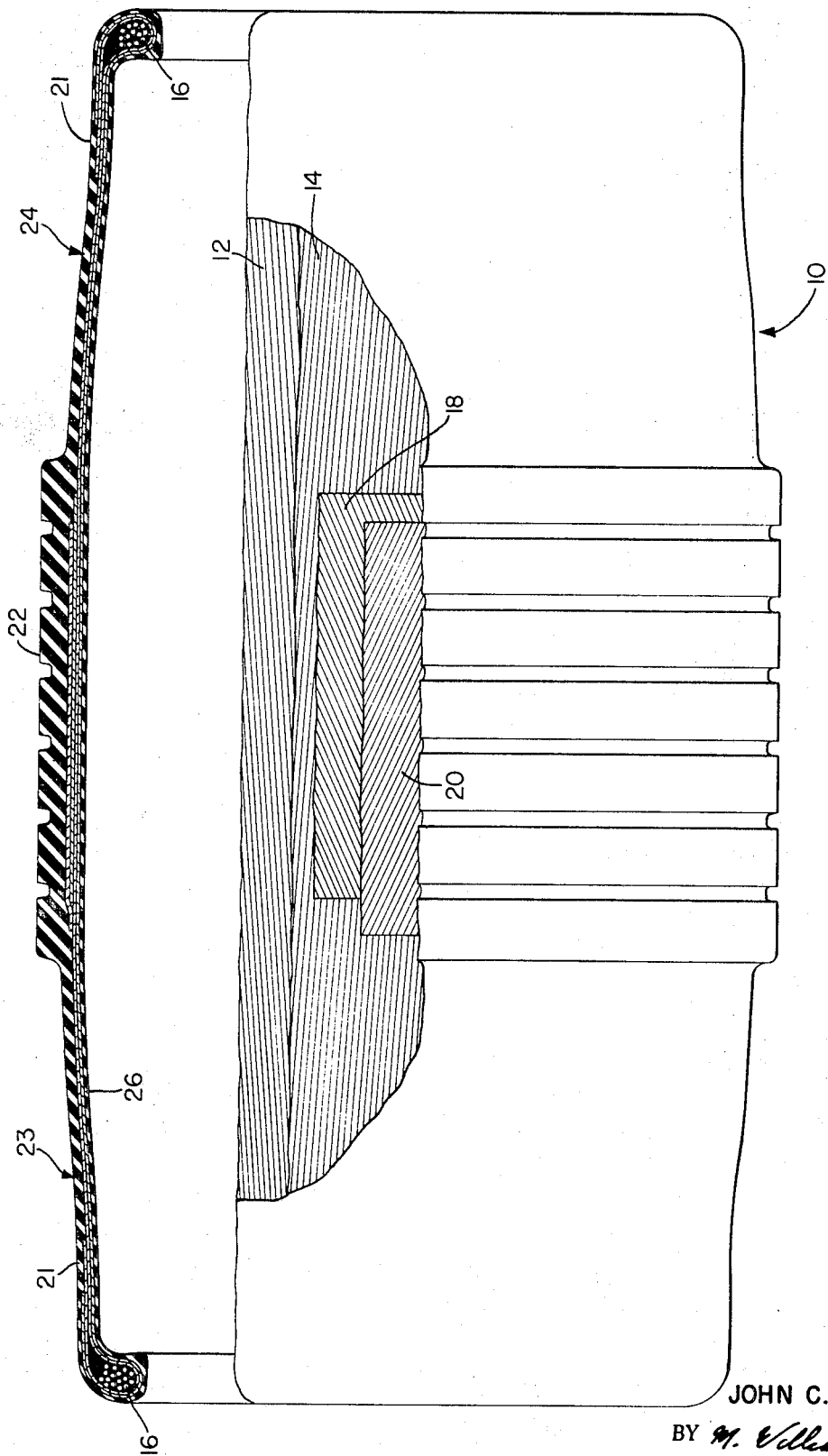
FIG. 1 is a side view, partly in section, of a pneumatic tire constructed in accordance with the present invention.

With reference to the drawings and particularly FIG. 1, a pneumatic tire 10 constructed in accordance with the present invention comprises a carcass which is of generally cylindrical shape and which includes an inner reinforcing ply 12 and an outer reinforcing ply 14. In the specific embodiment shown, both plies 12 and 14 are fabricated from cord fabric, and the cords of the fabric extend primarily in the direction of the longitudinal axis of the carcass, for example, 75 to 90°. The carcass further includes a circular inextensible bead ring 16 at each of the opposite ends of the carcass. The bead rings are arranged concentrically of the longitudinal axis of the carcass, and the ends of the carcass plies 12 and 14 are turned about the bead rings in a conventional manner.

Disposed circumferentially of and entirely about the carcass and arranged centrally thereof are a pair of restraining plies or belts 18 and 20 which in the specific embodiment shown are fabricated from cord fabric. The cords of the plies 18 and 20 extend at a relatively large angle, for example, at least 45°, to the circumferential centerline of the carcass at said centerline. The reinforcing plies or belts 18 and 20 are of a width substantially less than the length of the carcass and are preferably no greater in width than the tread 22 which is disposed over the belts 18 or 20 and extends circumferentially of and entirely about the central portion of the carcass.

The tire of FIG. 1 is built by the conventional flat band method, that is to say the carcass plies are laid about a generally cylindrical drumlike member. The bead rings 16 are then located adjacent the ends of the carcass plies 12, 14, and the ends of the plies are turned about the bead rings. Unlike a conventional method of manufacturing a radial ply belted tire wherein the carcass is at least partially shaped toward a toroidal configuration before the belt plies are applied, in the building of the tire of this invention, the belt plies 18 and 20 are applied while the carcass is in a cylindrical shape. Also, unlike conventional radial ply tire building, the tread 22 is applied over the belt plies while the carcass is still in its cylindrical configuration. An outer layer of sidewall stock 21 may be placed on each of the sidewalls 23, 24, either before or after the tread is applied. The tire of FIG. 1 is of the tubeless variety and accordingly also may include an air impervious liner as shown at 26. Also, the tire may include additional conventional elements such as chafers, cushion strips between the carcass and belt plies, etc., depending upon the particular manufacturer's desires.

In accordance with the present invention the tire is cured in the shape in which it was built, that is to say in a generally cylindrical configuration. This is contrary to the conventional practice of shaping an uncured tire to a generally toroidal shape either preceding or during the curing operation. Also, if desired, the tire may be cured, for example in open steam, without using a mold, although use of a mold is preferable, particularly insofar as it is desired to provide a tread pattern on the ground contacting portion of the tread.

With reference to FIG. 2, after the tire has been cured, it may be placed upon a split rim generally indicated at 30 and comprising two halves 32 and 34. The rim halves are brought together to space the beads generally at the distance that the beads will be spaced when the tire is mounted on the rim on which it is intended for use and the tire is inflated to a shape generally similar to that of a conventional tire, as shown in solid line in FIG. 2. Thereafter, the tire is deflated while still being retained on the rim 30. As the tire deflates the tread 22 will move toward the rim 30, as shown in broken line in FIG. 2, or in other words there will be a reduction in the section height of the tire. At the same time the sidewalls 23, 24 will bulge outwardly in a generally symmetrical manner. After a certain amount of deflation of the tire, tread will begin to move to one side, generally in the direction of the rotational axis of the tire, and on continued deflation the tire will assume a shape generally as shown in chain dotted line in FIG. 2. In this last mentioned position of the tire, it will be observed that the sidewall 23 extends inwardly and lies over a major portion of the rim 30 while the tread 22 extends well beyond one edge of the rim and is generally inclined toward the rotational axis of the tire.

As the tire is deflated still further, while oriented with the rotational axis of the tire extending horizontally the tire will assume a shape generally as shown in solid line in FIG. 3. Here it will be observed that the central portion of the sidewall 23 is bulged outwardly of the rim a substantial amount. The tire as shown in FIG. 3 is substantially completely deflated, or more particularly the air within the tire is substantially at atmospheric pressure. At this point if relative movement between the tire and the rim is effected so as to move the tread 22 in a direction to center the same relative to the rim, the central bulged portion in the sidewall 23 will be rotated counterclockwise, as viewed in FIG. 3, and the sidewall 23 will be folded beneath the tread in a generally S-shape, as shown in chain dotted line in FIG. 3. This centering of the tread may be accomplished by laying the tire and rim on the ground so that the sidewall 23 is on the upperside of the tire and then exerting a downward force on the rim. At the same time the sidewall 24 will also tend to assume the folded position shown in FIG. 4. However, it is usually necessary to manually complete the folding of the sidewall 24. If the tire is oriented so that its rotational axis is vertical and the sidewall 23 is on the upperside of the tire during the deflation, the weight of the rim will tend to initiate folding of the sidewall 23, and the sidewalls may assume the shape shown in chain dotted line in FIG. 3.

After the sidewalls of the tire have been folded into the condition shown in FIG. 4, the tire may be removed from the split rim 30 and the tire will remain in the folded condition shown in FIG. 4, whereupon it may later be mounted on a conventional rim while still folded. The tire may be subsequently inflated when necessary and again may be deflated with attendant folding of the sidewalls, as heretofore described.

The construction of the belted foldable tire of FIGS. 1 through 4 has been described above as being generally conventional insofar as the various elements of the tire are concerned, although of course, the building and molding of the complete tire in a generally cylindrical shape is not conventional. Further, the sidewall of the tire is relatively thin as compared to conventional tires. For example, the sidewall rubber 21 may have a thickness on the order of .050 inch. The rubber itself may be of conventional sidewall stock. Also, the tread portion 22 may be thinner than the tread portion normally associated with conventional tires where the tire is intended for use only as a spare tire, and it is not intended that the tire will have to provide the treadwear normally associated with passenger car tires. However, if desired the tread may be provided with greater thickness in order to provide greater tread mileage.

In a specific working example of a belted foldable tire constructed in accordance with this invention the tire was of a 7.35 × 14 size. The tire had an outer diameter when inflated of about 26 inches and when deflated and folded had an outer diameter of about 16 inches, both as measured at the centerline of the tread. Two plies of rayon cord fabric were used for the reinforcing plies of the carcass. Each ply of cord fabric comprised rayon cords, each being of a 1650/2 construction, or in other words comprising two yarns of 1650 denier each. The cords were of generally conventional construction each yarn being initially twisted about 12 turns per inch, and the yarns were then plied together with a reverse twist of about 12 turns per inch. The cord fabric was bias cut to provide a cord angle of approximately 85° for the carcass plies. The same cord fabric was used in the construction of the belt plies 18 and 20 as in the carcass plies, except that the fabric for the belt plies was bias cut to provide a cord angle of about 65° at the centerline of the tire when the tire was in its cylindrical shape, as shown in FIG. 1. When the cured tire was inflated the cord angle of the belt plies reduced to approximately 35° at the centerline of the tread.

While in the specific example discussed above cord fabric was used for the carcass plies and restraining plies, other suitable material other than cord fabric may be used for these plies. Also when cord fabric is used, the cords may be of any material found to be suitable for the purpose. Also while the reinforcing elements of the fabric have been described as cords each comprising a plurality of twisted yarns which are reverse twisted to provide the cords, any other suitable construction for the reinforcing elements may be utilized without departing from the invention. Also where fabric is used it may have pick cords extending across the reinforcing elements, as is conventional, or the fabric may be of pickless or any other suitable construction.

Regardless of the construction which is used it is important that the sidewalls be maintained sufficiently flexible that the folding described above may be accomplished. If the sidewalls are too stiff it will not be possible to fold the sidewalls to the configuration shown in FIG. 4. While it is not practical to attempt to define any specific value for the flexibility required for the sidewalls, it will be apparent to those skilled in the art that such things as cord construction, cord material, modulus of the rubber or other material used in the reinforcing plies and for the sidewall layer 21, and cord angle of the cords will affect the stiffness of the sidewalls. It is believed to be only necessary to state that the construction of the sidewalls should be such that their flexibility is sufficient to permit the tire to be folded in the manner described above and preferably to permit the tire to maintain its folded condition when dismounted from a rim. By way of illustration in the 7.35 × 14 tire mentioned above, the sidewalls of the tire included the two plies of cord fabric each of which had a thickness, including the usual calendering rubber associated with tire cord fabric, of about .032 inch, an outer layer 21 of sidewall rubber laid over the carcass plies and having a thickness of about .050 inch, and an inner air retaining liner which had a thickness of about .055 inch.

While the carcass of the tire constructed in accordance with this invention may be cured in the cylindrical shape in which it was built, it is preferable to cure the tire in a slightly different shape in order to facilitate the initial folding of the sidewalls. More specifically, when the carcass is built on a cylindrical drum by the flat band method the carcass will usually, when on the drum, have an inner diameter which is uniform over at least the great majority of the length of the portion of the carcass extending between the bead portions. It is preferred to cure the uncured tire in a mold designed to provide that the inner diameter of the carcass at the lateral edges of the tread portion is slightly larger (for example, 0.4 inch in the 7.35 × 14 tire mentioned above) than it was when the tire was initially built. This difference in diameter, for example, may represent approximately twice the total thickness of a sidewall of the tire. The sidewalls of the tire are thus molded and cured in a generally frustoconical shape. However, the molded tire may still be considered to be generally cylindrical, particularly inasmuch as the mold for the sidewalls is lacking in any curvature other than in a direction circumferentially of the tire axis.

The tire of this invention has been described as characterized by the fact that the tire is cured in a generally cylindrical shape. Even when the tire is cured in a mold and the sidewalls are folded very soon after the tire is removed from the mold and while the tire is still quite hot, the cure of the tire will have been sufficiently completed while the tire was in the mold that the tire may be described as having been cured while in the cylindrical shape. This is evidenced by the fact that, if the tire is folded while still hot and permitted to cool in its folded shape, when the tire is dismounted from the rim and the beads displaced away from each other the sidewalls will return to their normal generally cylindrical shape; for example, substantially as shown in FIG. 1. In other words, even though some polymerization of rubber or rubberlike components in the sidewall may continue after the tire has been folded, there is no resulting permanently set fold in the sidewall as a result of cooling the tire in its folded condition. Thus, for all intents and purposes the tire may be described as being cured in a cylindrical shape.

Figure 5:
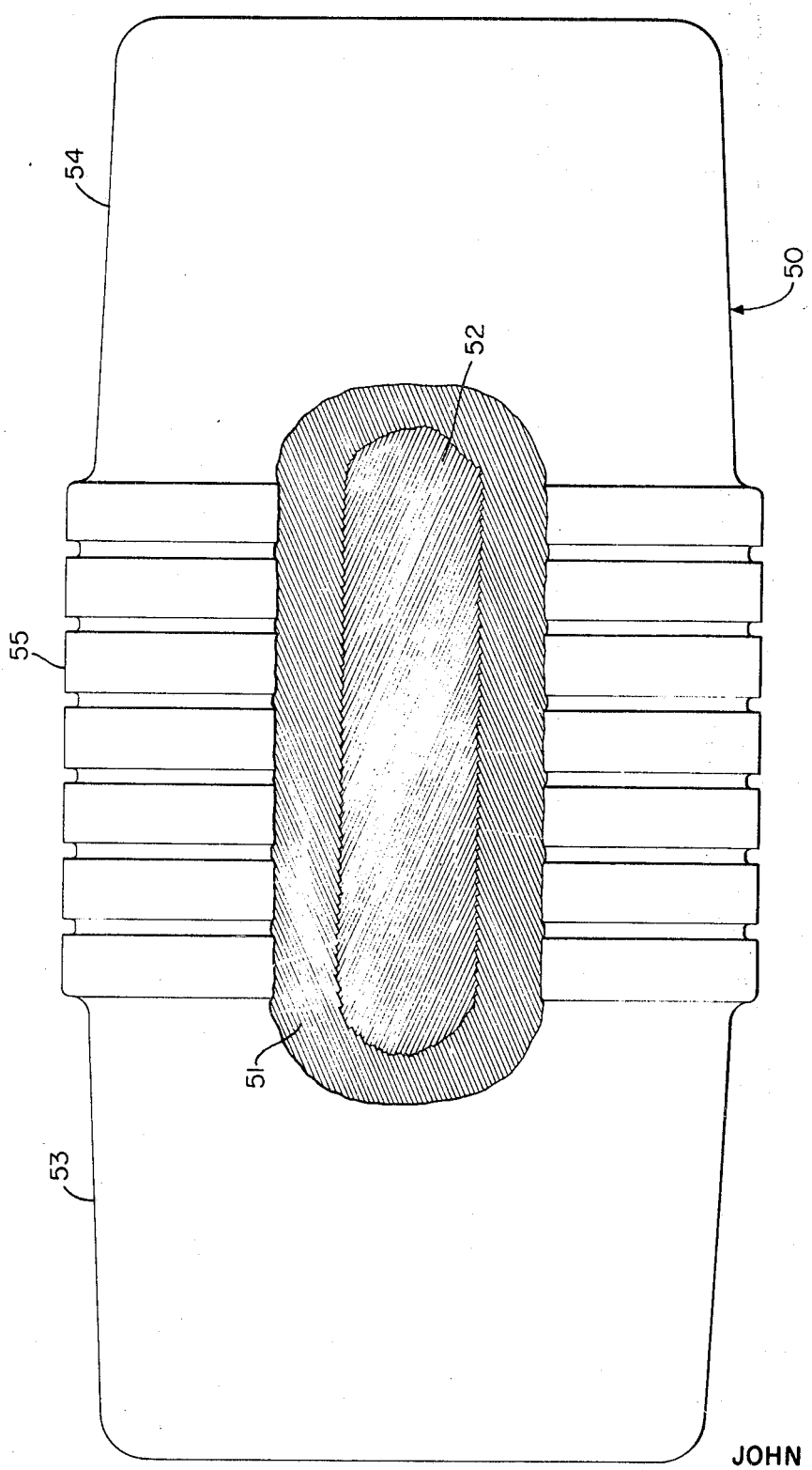
FIG. 5 is a side view, partly cut away, of a pneumatic tire constructed in accordance with another aspect of the invention.

With reference to FIG. 5, there is shown an alternate construction of a tire according to this invention. The tire 50, like the tire 10, is completely built by the conventional flat band process. The tire 50 has two reinforcing plies 51, 52 which in the specific embodiment shown are of cord fabric and the cords of each ply extend at a substantially larger angle to the longitudinal axis of the tire than the cords of the plies 12 and 14 of FIG. 1. The tire 50 will not be described in detail in that it is essentially the same construction as a conventional bias ply carcass tire built by the flat band method with the principal exceptions that in accordance with the invention the sidewalls 53, 54 are sufficiently flexible to permit the sidewalls to be folded to the configuration shown in FIG. 4. In accordance with the invention the tire 50 is cured in the same manner as described above in connection with the tire 10 so as to provide the completely manufactured tire, and particularly the sidewalls, with a generally cylindrical configuration. After the tire has been cured it may be placed on a split rim 30 and inflated whereupon it will assume a shape generally as shown in solid line in FIG. 6. Subsequently the tire is deflated whereupon the tread portion will return toward the diameter it had when it was molded, or in other words the tread will move toward the rim 30, as shown in chain dotted line in FIG. 6. At the same time both sidewalls 53, 54 will bulge outwardly. As the tire further deflates the sidewalls are folded inwardly so as to assume the position shown in broken line in FIG. 6 and the tread 55 is centered on the rim 30. The folded tire is then removed from the rim 30 and may later be installed on a conventional rim while still folded.

The tire 50 as shown in FIG. 5 is not provided with any restraining or other plies between the carcass and the tread. However, if desired such plies or belts may be provided. In either event where a cord fabric is used for the carcass plies the cord angle of the carcass plies will normally be in excess of 55° relative to the circumferential centerline of the carcass at said centerline when the carcass is in its cylindrical shape, as is also generally true of the tire 10, previously described. Where restraining plies or belts are used in the tire 50 they will be generally similar to the belts 18 and 20, previously described. Where such restraining plies are of cord fabric, the cord angle of the fabric will normally be in excess of 45° relative to the circumferential centerline of the carcass at said centerline when the carcass is in its generally cylindrical shape, as is also generally true of the belts 18 and 20, previously described.

In the foregoing description the initial folding of the tire has been described in terms of initially inflating the tire to its normal inflation shape and then, while the tire is being deflated, accomplishing the folding of the sidewalls. However, if desired the tire need not be fully inflated prior to deflation to accomplish the folding of the sidewalls, and it is further contemplated that the tire may be folded without requiring substantial, if any, inflation of the tire provided sufficient force is used to accomplish the fold and care is taken not to damage the tire.

While the tire of this invention has been described in terms of a spare tire for a passenger vehicle, this is not to say that the tire will not have advantageous use in other types of service or in connection with other types of vehicles. Also, while the tire has been described in terms as having, in folding, an outer diameter not substantially greater than the maximum outer diameter of a rim, this is not to exclude from the scope of this invention a tire having, when deflated, an outer diameter which is substantially larger than rim diameter, although substantially less than the diameter of the tire when fully inflated and whether or not the sidewalls of the tire are folded. As noted above a principal characterizing feature of this invention is that the completely manufactured tire has a generally cylindrical shape when the beads or ends of the tire are spaced at their maximum permissible spacing and all external force has been removed from the tire.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. A completely manufactured pneumatic tire comprising a central tread portion and a carcass portion including sidewall portions extending outwardly from the edges of said tread portion and terminating in inextensible bead portions, said sidewall portions, when the tire is unmounted, being substantially free of any curvature other than in a direction about the rotational axis of the tire, the tire having a length in the direction of its rotational axis and having a maximum diameter at its circumferential centerline which are substantially greater and smaller respectively when the tire is not mounted on a rim and is uninflated than when the tire is mounted on a rim and inflated.

2. A tire as described in claim 1 wherein said carcass portion comprises a reinforcing ply extending between said bead portions, said reinforcing ply including reinforcing elements which when the tire is unmounted extend at an angle in excess of 55° to the circumferential centerline of the tire at said centerline.

3. A tire as described in claim 2 further comprising at least one additional reinforcing ply disposed between the carcass portion and the tread, said additional ply having a width at most not substantially greater than the width of the tread portion.

4. A tire as described in claim 3 in which said additional ply includes cords extending at an angle in excess of 45° to the circumferential centerline of said tread portion at said centerline.

5. A tire as described in claim 2 wherein said reinforcing elements extend primarily longitudinally of said carcass portion.

6. In a foldable pneumatic tire comprising a central generally annular tread portion, and a pair of sidewall portions respectively extending from the opposite edges of said tread portion and terminating in inextensible beads, said sidewall portions being folded inwardly toward each other so as to be beneath said tread portion, said tire being characterized by said sidewall portions having a generally cylindrical shape substantially free of any curvature except in the direction about the rotational axis of the tire when the tire is unmounted, the sidewall portions thereof unfolded and all external force is removed therefrom.

7. In a foldable tire as described in claim 6, said sidewall portions being disposed substantially entirely between the edges of said tread portion when the tire is folded, the outer diameter of said tread portion being substantially greater when the tire is inflated than when the tire is uninflated.

8. In a foldable pneumatic tire comprising a carcass having a pair of spaced inextensible beads at its opposite ends respectively, and a tread portion disposed centrally about said carcass and having a diameter which in the uninflated condition of the tire is not substantially greater than the diameter of the beads, the improvement wherein said carcass includes sidewalls extending between said beads and tread which, when the tire is unmounted, are normally substantially cylindrical so as to be substantially free of any curvature except in a direction about the rotational axis of the tire, each said sidewall having sufficient flexibility to permit the folding thereof upon itself so as to dispose the sidewall beneath the tread and in a generally S-shape configuration.

9. A foldable pneumatic tire as described in claim 8 in which said carcass comprises at least one reinforcing ply including reinforcing elements extending at an angle in excess of 55° to the circumferential centerline of the tread at said centerline.

10. A foldable pneumatic tire as described in claim 9 further comprising at least one belt ply disposed between the carcass and the tread.

11. A foldable pneumatic tire as described in claim 10 in which said belt ply includes reinforcing elements extending at an angle of at least 45° to said centerline.

12. A foldable pneumatic tire as described in claim 9 in which said reinforcing elements of said reinforcing ply extend at an angle of at least 75° at said centerline, and at least one belt ply disposed between the carcass and the tread, said belt ply including reinforcing elements extending at an angle of at least 45° and less than 75° to said centerline at said centerline.

UNITED STATES PATENT OFFICE
CERTIFICATE OF CORRECTION

Patent No. 3,540,510      Dated November 17, 1970

Inventor(s) John C. Smithkey, Jr.

It is certified that error appears in the above-identified patent and that said Letters Patent are hereby corrected as shown below:

On the first printed page of the patent and immediately following the Abstract of the Disclosure insert:

The foregoing abstract is not to be taken as limiting the invention of this application, and in order to understand the full nature and extent of the technical disclosure of this application, reference must be made to the accompanying drawings and the following detailed discription.

Signed and sealed this 8th day of June 1971.

(SEAL)
Attest:

EDWARD M. FLETCHER, JR.       WILLIAM E. SCHUYLER, JR.
Attesting Officer      Commissioner of Patents